United States Patent
Goodier et al.

(10) Patent No.: US 10,081,499 B2
(45) Date of Patent: Sep. 25, 2018

(54) SYSTEM FOR LOADING DRY BULK MATERIALS INTO TANK TRAILER

(71) Applicant: Paragon Tank Truck Equipment, LLC, Milwaukee, WI (US)

(72) Inventors: Peter Charles Goodier, White, GA (US); Drake Duane Miller, White, GA (US)

(73) Assignee: PARAGON TANK TRUCK EQUIPMENT, LLC, Milwaukee, WI (US)

(*) Notice: Subject to any disclaimer, the term of this patent is extended or adjusted under 35 U.S.C. 154(b) by 0 days.

(21) Appl. No.: 15/265,128

(22) Filed: Sep. 14, 2016

(65) Prior Publication Data

US 2018/0044121 A1    Feb. 15, 2018

Related U.S. Application Data

(60) Provisional application No. 62/373,178, filed on Aug. 10, 2016.

(51) Int. Cl.
  *B65G 53/24* (2006.01)
  *B65G 53/66* (2006.01)
  *B60P 1/00* (2006.01)

(52) U.S. Cl.
  CPC ............ *B65G 53/24* (2013.01); *B60P 1/00* (2013.01); *B65G 53/66* (2013.01)

(58) Field of Classification Search
  CPC ........ B65G 53/24; B65G 53/60; B65G 65/20; B65G 67/02; B60P 1/60
  USPC ..... 406/34, 39, 122, 139, 151, 152; 414/507
  See application file for complete search history.

(56) References Cited

U.S. PATENT DOCUMENTS

| | | | | |
|---|---|---|---|---|
| 1,314,677 A | * | 9/1919 | Linton | B65G 53/00 110/165 A |
| 2,803,501 A | * | 8/1957 | Kennett | B65G 53/24 406/151 |
| 3,613,915 A | * | 10/1971 | Vita | B65F 1/127 15/340.1 |
| 3,621,893 A | * | 11/1971 | Nishimura | B60P 1/60 134/166 R |
| 3,819,069 A | * | 6/1974 | Bauman | B60P 1/60 141/67 |

(Continued)

*Primary Examiner* — Joseph A Dillon, Jr.
(74) *Attorney, Agent, or Firm* — Christopher C. Dremann, P.C.; Christopher C. Dremann

(57) ABSTRACT

A system for loading fry bulk materials into a tank trailer includes a blower assembly mounted on a tank truck that is in pneumatic communication with the interior of a tank of the tank trailer through at least one conduit. The blower assembly includes a blower and a blower filter in pneumatic communication with the blower through a suction line. The blower assembly further includes a vacuum gauge for monitoring the vacuum pressure of the airflow between the blower filter and the blower and an optional check valve for passing the airflow from the ambient atmosphere in the event that the vacuum pressure of the airflow exceeds a predetermined maximum vacuum pressure for safe operation of the blower. The predetermined maximum vacuum pressure may be no more than about five inches of mercury vacuum pressure (5 in-Hg; 2.46 psi). An operating vacuum pressure of the blower may be between about seventeen inches of mercury (17 in-Hg; 8.35 psi) and about five inches of mercury (5 in-Hg; 2.46 psi).

19 Claims, 5 Drawing Sheets

(56) References Cited

U.S. PATENT DOCUMENTS

| | | | | |
|---|---|---|---|---|
| 4,016,994 A * | 4/1977 | Wurster | .................... | B60P 1/60 261/79.2 |
| 4,017,281 A * | 4/1977 | Johnstone | .......... | B01D 46/0057 15/340.1 |
| 4,082,672 A * | 4/1978 | Petroski | .................... | B60P 1/60 210/205 |
| 4,189,262 A * | 2/1980 | Anderson | ........... | B01F 13/0255 366/107 |
| 4,320,995 A * | 3/1982 | Tennes | .................... | A23N 12/02 406/106 |
| 4,659,262 A * | 4/1987 | van Aalst | ............... | B65G 53/24 15/340.1 |
| 5,120,165 A * | 6/1992 | Walko, Jr. | ................ | B65G 53/24 406/171 |
| 5,195,852 A * | 3/1993 | Malugani | ............... | B65G 53/42 406/151 |
| 5,341,856 A * | 8/1994 | Appenzeller | .......... | B65G 53/28 141/231 |
| 5,718,017 A * | 2/1998 | Pavlick | .................. | B65F 3/0209 15/340.1 |
| 6,045,298 A * | 4/2000 | Lytle | ..................... | B05B 7/1409 406/122 |
| 6,343,896 B1 * | 2/2002 | Goodier | .................... | B60P 1/60 406/198 |
| 6,454,496 B1 * | 9/2002 | Mills | ......................... | B60P 1/60 406/146 |
| 6,588,053 B1 * | 7/2003 | Nowak | .................. | A01G 1/125 15/340.1 |
| 2003/0206776 A1 * | 11/2003 | Pearson | .................... | B60P 1/60 406/122 |
| 2009/0202311 A1 * | 8/2009 | Deal | ...................... | E21B 21/062 406/41 |
| 2009/0285643 A1 * | 11/2009 | Brown | ..................... | B60P 1/60 406/41 |
| 2011/0103901 A1 * | 5/2011 | Hetcher | .................... | B60P 1/60 406/39 |
| 2015/0151662 A1 * | 6/2015 | Hetcher | .................... | B60P 1/60 406/10 |

* cited by examiner

SYSTEM FOR LOADING DRY BULK MATERIALS INTO TANK TRAILER

CROSS REFERENCE To RELATED APPLICATION

This United States utility non-provisional patent application claims the benefit of priority to the filing date of U.S. provisional patent Application No. 62/373,178 filed on Aug. 10, 2016, the contents of which are incorporated herein by reference.

FIELD OF THE INVENTION

The present invention relates to tank truck equipment for loading and unloading dry bulk materials. More specifically, the invention is a system for loading dry bulk materials into a tank trailer using a blower operated as a vacuum.

BACKGROUND OF THE INVENTION

Tank trailers are well known for transporting dry bulk materials. By way of example, a tank trailer may be used to transport dry bulk materials from a rail car to a raw material processing plant or a manufacturing facility. The tank trailer is typically attached to a tank truck (also commonly referred to as a "tank tractor") to transport the tank trailer from the rail car to the processing plant or the manufacturing facility. In some instances, a blower mounted on the tank truck is used to unload (also commonly referred to as "discharge" or "off-load") the dry bulk material from the tank trailer into a storage container at the processing plant or manufacturing facility. The blower may also be operated as a vacuum to load the dry bulk material from the rail car into the tank trailer. However, the operator must take care that the blower is not operated beyond its maximum vacuum capacity, which could lead to an overheating condition and eventually result in a total failure of the blower.

By way of example, a blower assembly including a blower, a blower muffler and a blower filter are mounted on the tank truck. A dry bulk material tank and a trailer filter are provided on the tank trailer. The blower assembly on tank truck is connected in pneumatic (i.e., air) communication with the trailer filter on the tank trailer through one or more flexible hoses and/or rigid conduits. When the blower is operated as a vacuum to load dry bulk material into the dry bulk material tank of the tank trailer, air is pulled through the blower filter and discharged to atmosphere through an outlet port provided on the blower muffler. The air is further pulled from the trailer filter through the hoses and/or conduits that connect the blower assembly to the trailer filter. The trailer filter is likewise in pneumatic (i.e., air) communication with the interior of the dry bulk material tank on the tank trailer through at least one flexible hose and/or rigid conduit. The air is further pulled from the interior of the dry bulk material tank on the tank trailer through the hose and/or conduit to the trailer filter. Thus, a vacuum is created within the fry bulk material tank to load the tank trailer with dry bulk material from, for example, a rail car connected to the tank of the tank trailer by at least one flexible hose and/or rigid conduit.

A serious problem can occur if the dry bulk material being loaded into the tank trailer is carried into the vacuum filter. The trailer filter may clog and prevent air from flowing freely from the trailer filter to the blower assembly on the tank truck. In some cases, for example if the trailer filter is damaged, the dry bulk material may pass through the trailer filter and be carried to the blower filter. In either event, the blower may become starved of air at the suction line between the blower and the blower filter, and consequently, operate beyond its maximum vacuum capacity. When the blower is operated beyond its maximum vacuum capacity for an excessive period of time it can overheat and cause internal contact between its moving parts, which typically results in a total failure of the blower. A total failure of the blower requires a time-consuming, and thus costly, replacement of the blower on the tank truck. The tank trailer may be provided with a vacuum gauge positioned at a convenient location on the tank trailer for monitoring the vacuum pressure at the trailer filter. However, no indication is given to the operator that the blower is being starved of air at the suction port if either the trailer filter or the blower filter is clogged, or there is some other restriction in the connecting hoses and/or conduits, such as a closed valve.

SUMMARY OF THE INVENTION

In one aspect, the invention is embodied by a system for loading dry bulk materials into a tank trailer. The system includes a blower assembly adapted to be mounted on a tank truck in pneumatic communication with a tank of the tank trailer via at least one conduit. The blower assembly includes a blower and a blower filter in pneumatic communication with the blower. The blower assembly further includes a vacuum gauge that is operable for monitoring a vacuum pressure of an airflow between the blower filter and the blower.

In one embodiment, the vacuum gauge is mounted between the blower filter and the blower. In a further embodiment, the vacuum gauge is operable for monitoring an operating vacuum of the blower within a suction line that is disposed between the blower and the blower filter.

In one embodiment, the blower assembly further includes a check valve that is in communication with the blower. The check valve is configured to pass an airflow from the ambient atmosphere in the event that the operating vacuum of the blower exceeds a predetermined maximum vacuum pressure for safe operation of the blower.

In one embodiment, the predetermined maximum vacuum pressure for safe operation of the blower is no more than about five inches of mercury (5 in-Hg; 2.46 psi). In a further embodiment, the blower is configured to operate as a vacuum to produce an operating vacuum pressure of at least about seventeen inches of mercury (17 in-Hg; 8.35 psi). In a further embodiment, the blower is configured to operate as a vacuum to produce an operating vacuum pressure between about seventeen inches of mercury (17 in-Hg; 8.35 psi) and about five inches of mercury (5 in-Hg; 2.46 psi).

In another aspect, the invention is embodied by a system for loading dry bulk materials into a tank trailer. The system includes a blower assembly adapted to be mounted on a tank truck.in pneumatic communication with a tank of the tank trailer via at least one conduit. The blower assembly includes a blower, a blower filter in pneumatic communication with the blower, and a check valve operable for passing an airflow from the ambient atmosphere to the blower in the event that the vacuum pressure at the blower exceeds a predetermined maximum vacuum pressure.

In one embodiment, the check valve includes a suction port, a seal, and a biasing element for biasing the seal in sealing engagement with the suction port. In a further embodiment, the check valve further includes a mounting plate for mounting the check valve to the blower filter. In a further embodiment, a biasing force exerted by the biasing element on the seal is overcome to displace the seal out of sealing engagement with the suction port when the vacuum pressure of the airflow at the blower exceeds the predetermined maximum vacuum pressure.

In one embodiment, the blower assembly further includes a vacuum gauge for monitoring a vacuum pressure of an airflow between the blower filter and the blower. In a further embodiment, the vacuum gauge measures the vacuum pressure of the airflow in a suction line between the blower filter and the blower. In a further embodiment, the vacuum gauge allows an operator to monitor the vacuum pressure at the blower of the blower assembly relative to the predetermined maximum vacuum pressure allowable for safe operation of the blower.

In one embodiment, the predetermined maximum vacuum pressure is no more than about five inches of mercury (5 in-Hg; 2.46 psi). In a further embodiment, the blower is configured to have an operating vacuum pressure of between about seventeen inches of mercury (17 in-Hg; 8.35 psi) and about five inches of mercury (5 in-Hg; 2.46 psi).

BRIEF DESCRIPTION OF THE DRAWING FIGURES

The following detailed description of the invention is best understood with reference to the accompanying drawing figures in which various exemplary embodiments of the invention are illustrated and wherein like reference numerals denote the same or similar systems, assemblies, components, elements, steps or the like throughout the different views.

DETAILED DESCRIPTION OF VARIOUS EMBODIMENTS OF THE INVENTION

Figure 1:
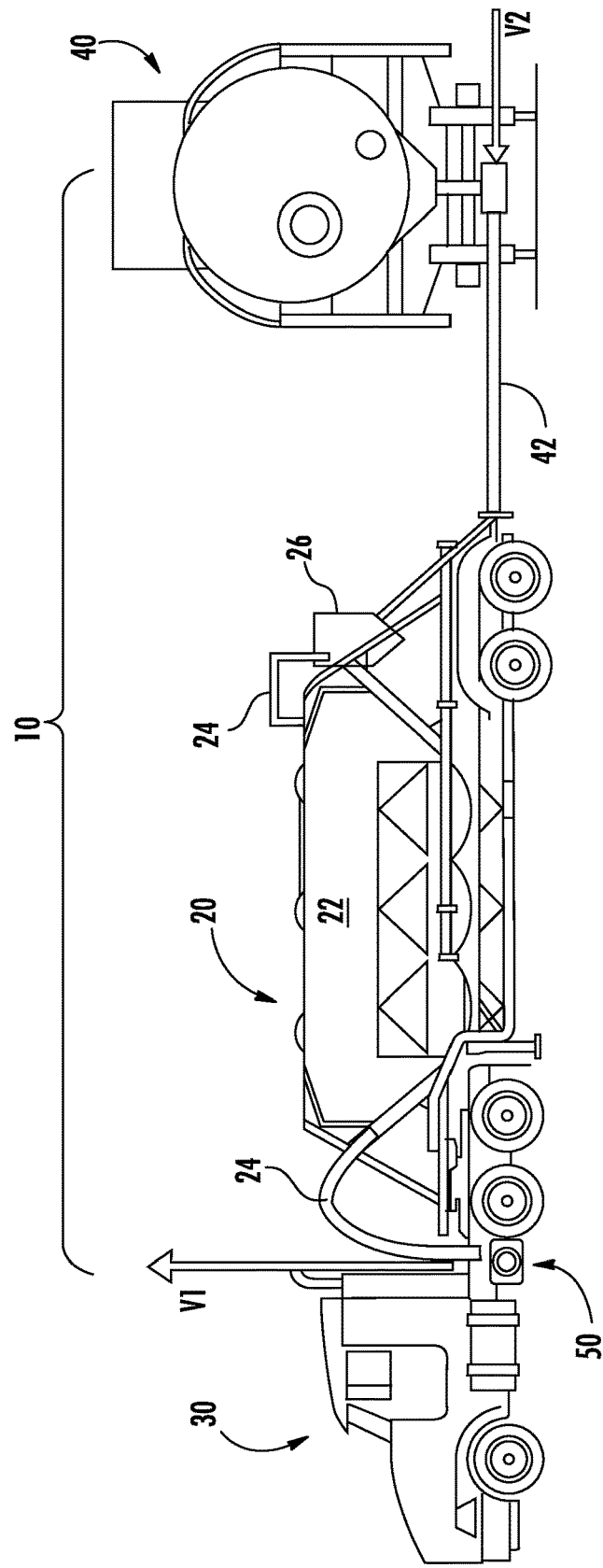
FIG. 1 is an environmental elevation view illustrating an exemplary embodiment of a system for loading dry bulk materials into a tank trailer according to present invention.

Referring now to the accompanying drawing figures, FIG. 1 illustrates a system, indicated generally by reference character 10, for loading dry bulk materials into a tank trailer, indicated generally by reference character 20. Typically, the tank trailer 20 is operably coupled to a tank truck, also referred to as a tank tractor, indicated generally by reference character 30. The tank truck 30 is attached to the tank trailer 20 for transporting the tank trailer from a location for loading the tank trailer to a location for unloading the tank trailer. By way of example and not limitation, the tank trailer 20 may be loaded with dry bulk material (not shown) from a rail car, indicated generally by reference character 40, and transported by the tank truck 30 to a raw materials processing plant or a manufacturing facility where the dry bulk material is unloaded from the tank trailer 20 into a storage container (not shown).

According to an exemplary embodiment of the system 10 of the present invention, a blower assembly, indicated generally by reference character 50, is mounted on the tank truck 30. For example, the blower assembly 50 may be mounted laterally between mounting rails provided on the rear of the tank truck 30. The blower assembly 50 mounted on the tank truck 30 comprises a blower 52 (FIG. 3) for unloading the dry bulk material from the tank truck 20 into the storage container. The blower assembly 50 is in communication with the interior of a conventional dry bulk material tank 22 on the tank trailer 20 in which the dry bulk material is stored. More particularly, the blower assembly 50 is in pneumatic (i.e., air) communication with the interior of the tank 22 of the tank trailer 20 through one or more pneumatic flexible hoses and/or rigid conduits 24 that extend between the tank truck 30 and the tank trailer 20. The blower 52 of the blower assembly 50 draws air from the ambient atmosphere at atmospheric pressure and compresses the air to a pressure greater than atmospheric pressure in a conventional manner. The pressurized air is delivered from the blower assembly 50 through the pneumatic hoses and/or conduit(s) 24 into the tank 22 of the tank trailer 20 to thereby unload the dry bulk material from the tank 22 into the storage container through at least one outtake conduit.

The blower 52 of the blower assembly 50 may also be operated as a vacuum, commonly referred to as "vacuum duty," for loading dry bulk materials into the tank 22 of the tank trailer 20. Essentially, the blower 52 of the blower assembly 50 draws air from the interior of the tank 22 of the tank trailer 20 through the pneumatic conduit(s) 24 and discharges the air into the ambient atmosphere. As a result, the air pressure in the tank 22 of the tank trailer 20 is substantially less than atmospheric pressure, thereby creating a vacuum in the interior of the tank 22. The interior of the tank 22 of the tank trailer 20 is also in pneumatic (i.e., air) communication through at least one hose and/or conduit with a source of the dry bulk material, such as a storage container, enclosure, bin or the like in which the dry bulk material is stored. The dry bulk material typically has a relatively small particle size and weight, and thus, is drawn from the source of the dry bulk material and loaded into the interior of the tank 22 of the tank trailer 20.

As illustrated in FIG. 1, the system 10 comprises a blower assembly 50 mounted on a tank truck 30 in a conventional manner. By way of example and not limitation, the blower assembly 50 may be mounted between the opposed support rails 32 of the tank truck 30. The blower assembly 50 is in pneumatic communication with the interior of the tank 22 of the tank trailer 20 through one or more couplings and pneumatic conduits 24 that extend between and connect the tank truck 30 with the tank 22 of the tank trailer 20. The interior of the tank 22 of the tank trailer 20 is likewise in pneumatic communication with a rail car 40 in which the dry bulk material is being stored through at least one intake conduit 42. FIG. 1 further illustrates that the blower assembly 50 is vented to the ambient atmosphere, as indicated by the arrow labeled with reference character V1, while intake conduit 42 is vented to the ambient atmosphere, as indicated by the arrow labeled with reference character V2.

Figure 2:
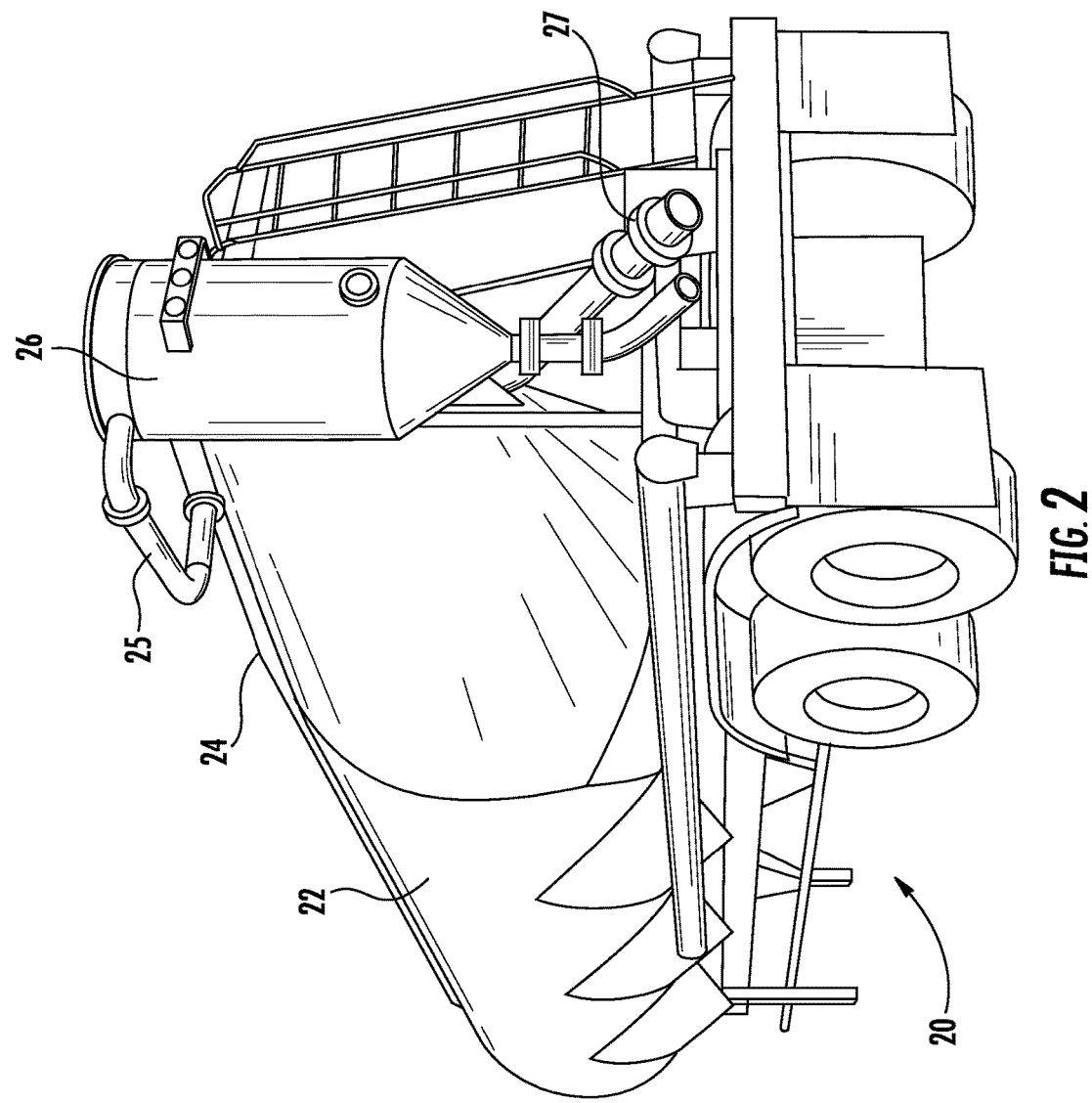
FIG. 2 is a rear perspective view of the tank trailer of the system of FIG. 1.

FIG. 2 is a rear perspective view of the tank trailer 20. FIG. 2 shows the tank trailer 20 has a trailer filter 26 mounted at the rear of the tank 22. The trailer filter 26 comprises at least one pneumatic conduit 25 for attachment to the pneumatic conduit 24 from the blower assembly 50 and at least one coupling 27 for attachment to the intake conduit 42 from the rail car 40. The trailer filter 26 is in pneumatic communication with the interior of the tank 22 of the tank trailer 20 such that the blower assembly 50 is in pneumatic communication with the interior of the tank 22 through the trailer filter 26.

Figure 3:
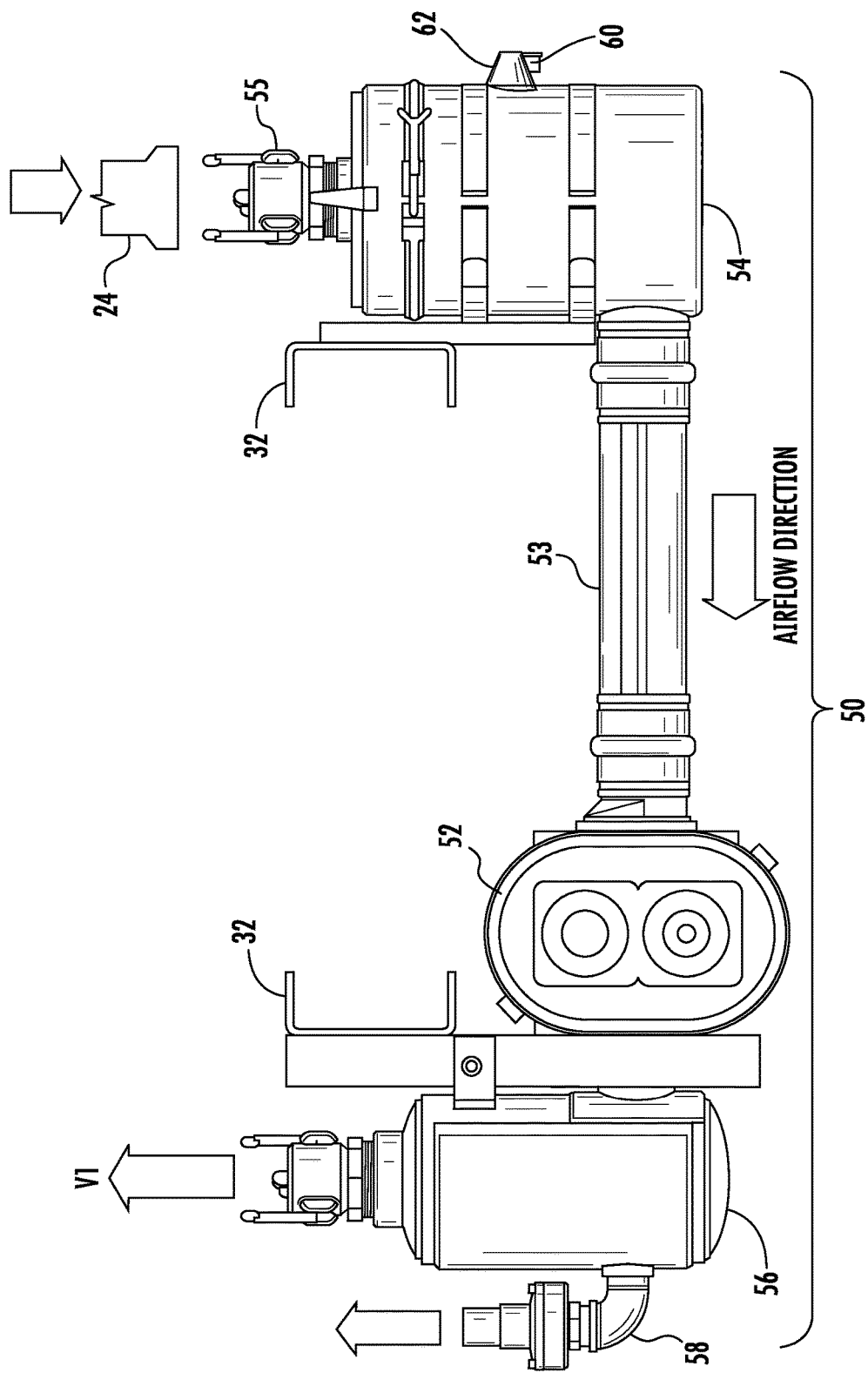
FIG. 3 is a lateral elevation view of an exemplary embodiment of a blower assembly of the system of FIG. 1 taken from the tank truck in the direction of the tank trailer and shown with a vacuum lid of the blower filter and a dust cap of the blower muffler removed for purposes of clarity.

FIG. 3 is an elevation view of the blower assembly 50 mounted between the opposed rails 32 of the tank truck 30. FIG. 3 is taken from the perspective of the tank truck 30 looking rearwards in the direction of the tank trailer 20. In an exemplary embodiment, the blower assembly 50 comprises the blower 52, a blower filter 54 and a blower muffler 56, also commonly referred to as a discharge muffler. Blower 52 and blower filter 54 are in pneumatic (i.e., air) communication through a relatively short length of a conduit 53, commonly referred to as a "suction line." In FIG. 3, the blower filter 54 is shown with a vacuum lid 54A (see FIG. 4; FIG. 5) removed for purposes of clarity. A dust cap of the blower muffler 56 is likewise shown removed for purposes of clarity. Preferably, the blower assembly 50 further comprises at least one pressure relief valve 58 for protecting the blower 52 from an overpressure condition. The blower assembly 50 may further comprise additional valves, sensors, gauges and the like in a known manner. FIG. 3 further illustrates that the blower filter 54 is connected by a suitable coupling 55 to the pneumatic conduit 24, such as a flexible hose, extending between the tank truck 30 and the tank trailer 20, while the blower muffler 56 is vented to the ambient atmosphere as indicated by the reference character V1.

As previously mentioned, the blower 52 of the blower assembly 50 is operated as a vacuum to load the dry bulk material from the rail car 40 into the tank trailer 20. In particular, the blower assembly 50 creates a vacuum in the interior of the tank 22 of the tank trailer 20 through the pneumatic conduits 24, 25 that extend between the tank truck 30 and the tank 22 of the tank trailer 20 through the trailer filter 26. The vacuum created in the tank 22 of the tank trailer 20 draws the dry bulk material from the rail car 40 into the tank 22 through the intake conduit 42. Thus, an airflow from the tank 22 of the tank trailer 20 to the blower assembly 50 mounted on the tank truck 30 is provided through the conduits 24, 25 and the trailer filter 26 into the blower filter 54 of the blower assembly 50. From the blower filter 54, the airflow is directed into the blower 52 through the suction line 53. The airflow from the blower 52 is then discharged to the ambient atmosphere through the blower muffler 56 at the discharge port indicate by reference character V1. The direction of the airflow with the blower 52 being operated as a vacuum is indicated by the series of arrows depicted in FIG. 3. A vacuum gauge (not shown) is typically provided on the tank trailer 20 for monitoring the vacuum pressure being drawn on the interior of the tank 22 of the tank trailer 20. By way of example and not limitation, the trailer vacuum gauge may be provided at a convenient location along the pneumatic conduit 24 between the blower filter 54 of the blower assembly 50 and the trailer filter 26. In this manner, the vacuum gauge on the tank trailer 20 can alert the operator to a buildup of the dry bulk material in the intake conduit 42 and/or the trailer filter 26 that may cause a clog within the intake conduit and/or the trailer filter 26.

It is also possible that fragments of the dry bulk material may pass through the trailer filter 26 and the pneumatic conduits 24, 25 into the blower filter 54 of the blower assembly 50. In this latter event, a buildup of the dry bulk material fragments in the blower filter 54 may occur and cause a clog of the blower filter. In either event, the blower 52 of the blower assembly 50 must produce additional energy to attempt to maintain the desired vacuum pressure in the tank 22 of the tank trailer 20. The additional energy generates increased temperatures in the blower 52 that may cause an overheating condition, and eventually, a total failure of the blower 52. At present, there is no reliable means for monitoring the vacuum pressure in the suction line 53 at the blower 52 of the blower assembly 50. As a result, the blower 52 of the blower assembly 50 is susceptible to seizing and total failure as a result of excessive operating temperature. The only feasible and practical remedy is to replace the blower 52, which is both costly and time consuming, and typically must be performed in the field at the loading location under adverse circumstances and conditions.

Figure 4:
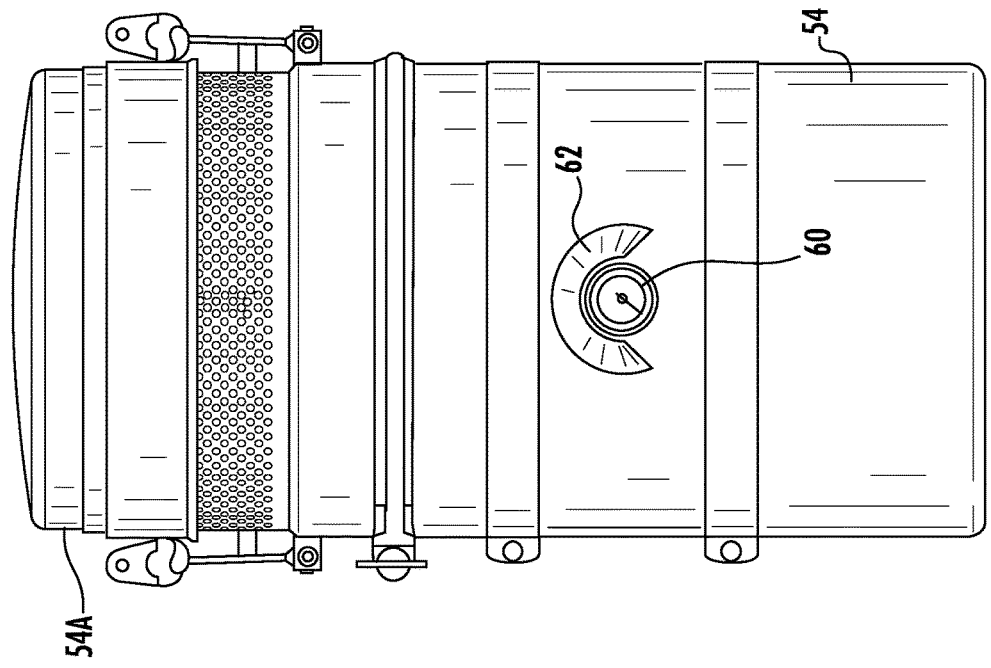
FIG. 4 is a lateral elevation view of an exemplary embodiment of the blower filter of FIG. 3 shown with the vacuum lid installed.
Figure 5:
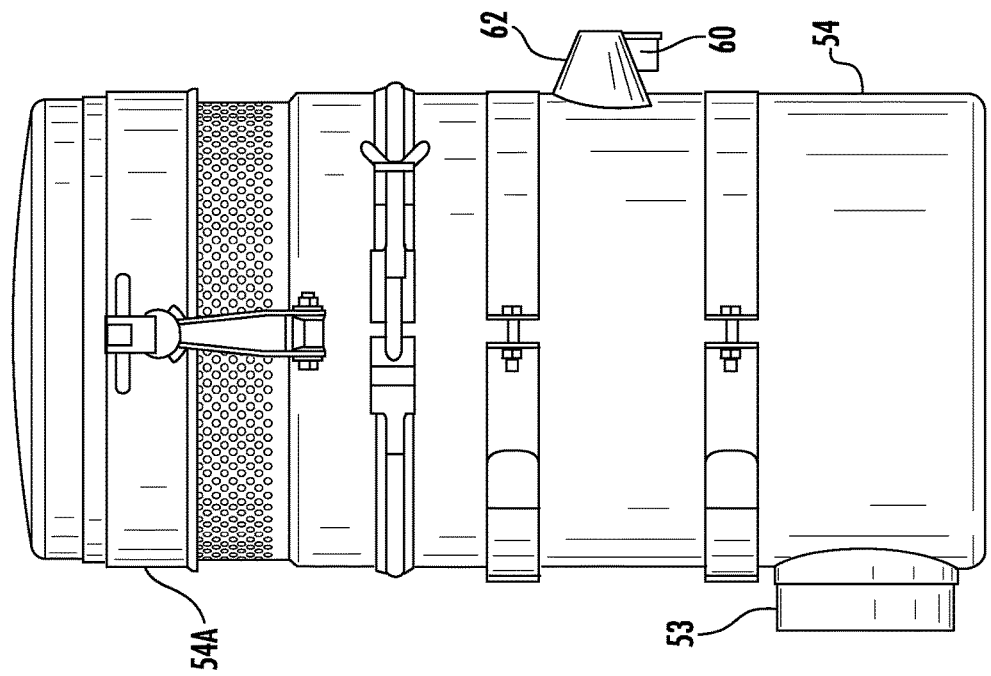
FIG. 5 is a side elevation view of the blower filter of FIG. 4.

FIG. 4 is a lateral elevation view showing an exemplary embodiment of the blower filter 54 of the blower assembly 50 in greater detail. As in FIG. 3, the blower filter 54 is viewed from the tank truck 30 looking rearwards in the direction of the tank trailer 20. FIG. 5 is a side elevation view of the blower filter 54. In FIG. 4 and FIG. 5, the blower filter 54 is shown with a vacuum lid 54A installed on the top of the blower filter 54 covering the coupling 55 that connects the pneumatic conduit 24 to the blower filter 54 of the blower assembly 50. Importantly, the blower assembly 50 further comprises a vacuum gauge 60 that is mounted on the exterior of the blower filter 54. The vacuum gauge 60 may be mounted at any desired location on the blower assembly 50. Alternatively, if desired, the vacuum gauge 60 may be mounted on the tank truck 30, for example along one of the rails 32 of the tank truck. However, mounting the vacuum gauge 60 on the outwardly facing exterior of the blower filter 54 allows the operator to readily locate, identify and read the vacuum gauge 60. If desired, a cover 62 may be provided to protect the vacuum gauge 60 from the ambient elements, such as rain, snow and ultraviolet light, as well as to shade the vacuum gauge from direct sunlight and thereby allow the operator to obtain a reading of the vacuum pressure indicated by the vacuum gauge.

The vacuum gauge 60 is operably coupled to a pressure sensor, referred to herein as a vacuum sensor (not shown), in a conventional manner. The vacuum sensor is positioned in the airflow of the system 10 from the trailer filter 26 of the tank trailer 20 to the blower assembly 50 on the tank truck 30. More particularly, the vacuum sensor is positioned in the airflow between the blower filter 54 and the blower 52. Preferably, the vacuum sensor is positioned in the airflow of the system 10 beyond one or more filter elements of the blower filter 54, but prior to entering the blower 52. By way of example and not limitation, the vacuum sensor is positioned within the suction line 53 between the blower filter 54 and the blower 52.

As a result, the vacuum sensor obtains a direct measure of the vacuum pressure of the airflow entering the blower 52. Thus, the vacuum gauge 60 indicates the vacuum pressure at the location of the blower 52 in the system 10 for loading dry bulk materials into the tank 22 of the tank trailer 20. Accordingly, the operator can monitor the vacuum pressure of the airflow between the trailer filter 26 on the tank trailer 20 and the blower 52 of the blower assembly 50. In the event that the vacuum pressure at the blower 52 exceeds a predetermined maximum vacuum pressure, the operator can shut down the system 10 before the blower 52 experiences an overheating condition and possible damage or failure. The vacuum pressure at the blower 52 may exceed the predetermined maximum vacuum pressure as a result of a buildup of fragments of the dry bulk material that clog the trailer filter 26 and/or the blower filter 54. Alternatively, or in addition, the maximum vacuum pressure may be exceeded as a result of a restriction of the airflow through the pneumatic conduits 24, 25 that extend between the trailer filter 26 mounted on the tank trailer 20 and the blower assembly 50 mounted on the tank truck 30, Alternatively, or in addition, the predetermined maximum vacuum pressure may be exceeded as a result of a restriction in the intake conduit 42 that extends between the source of the dry bulk material and the tank 22 of the tank trailer 20.

In one embodiment, the predetermined maximum vacuum pressure for safe operation of the blower 52 is no more than about five inches of mercury vacuum pressure (5 in-Hg; 2.46 psi). In another embodiment, the blower is configured to operate as a vacuum to produce an operating vacuum pressure of at least about seventeen inches of mercury (17 in-Hg; 8.35 psi). In a further embodiment, the blower is configured to operate as a vacuum to produce an operating vacuum pressure between about seventeen inches of mercury (17 in-Hg; 8.35 psi) and about five inches of mercury (5 in-Hg; 2.46 psi).

Figure 6:
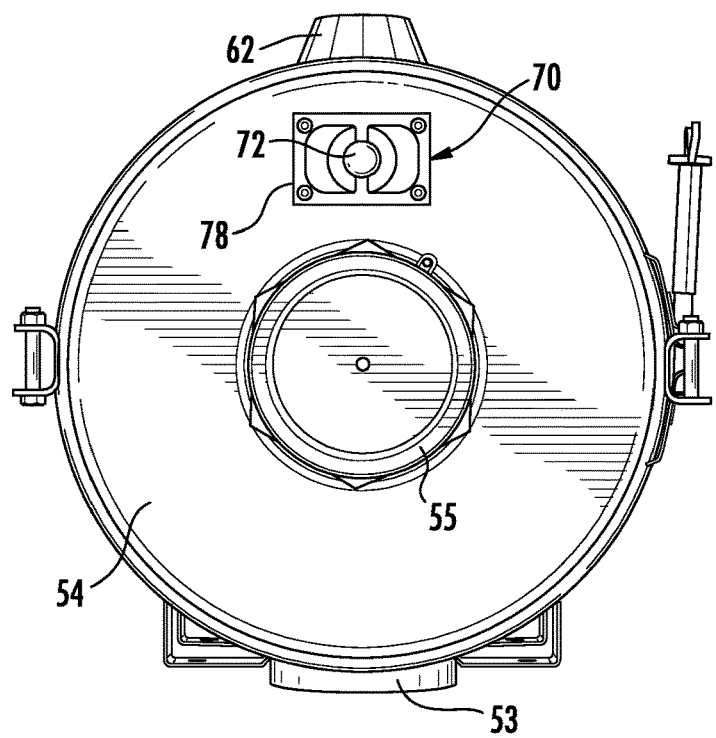
FIG. 6 is a top view of the blower filter of FIG. 3 showing a check valve of the blower assembly mounted on the blower filter.

If desired, the blower assembly 50 may further comprise an optional vacuum relief safety valve for passing the airflow from ambient atmosphere in the event that the operating vacuum pressure at the blower 52 approaches or exceeds the predetermined maximum vacuum pressure allowable for safe operation of the blower. FIG. 6 is a top view of the blower filter 54 of the blower assembly 50 according to another embodiment of the present invention including the optional vacuum relief safety valve. FIG. 6 shows a vacuum relief safety valve, referred to herein as check valve 70, mounted on the blower filter 54. The check valve 70 may be mounted at any suitable location on the blower assembly 50 within the airflow between the blower filter 54 and the blower 52. In a preferred embodiment, the check valve 70 is positioned in the airflow beyond one or more filter elements of the blower filter 54, but prior to the blower 52. Accordingly, the check valve 70 may be advantageously disposed on an upper surface of the blower filter 54, as shown in FIG. 6. In this manner, the check valve 70 is operable for passing the airflow from the ambient atmosphere to a point at which the vacuum pressure is greatest.

Figure 7:
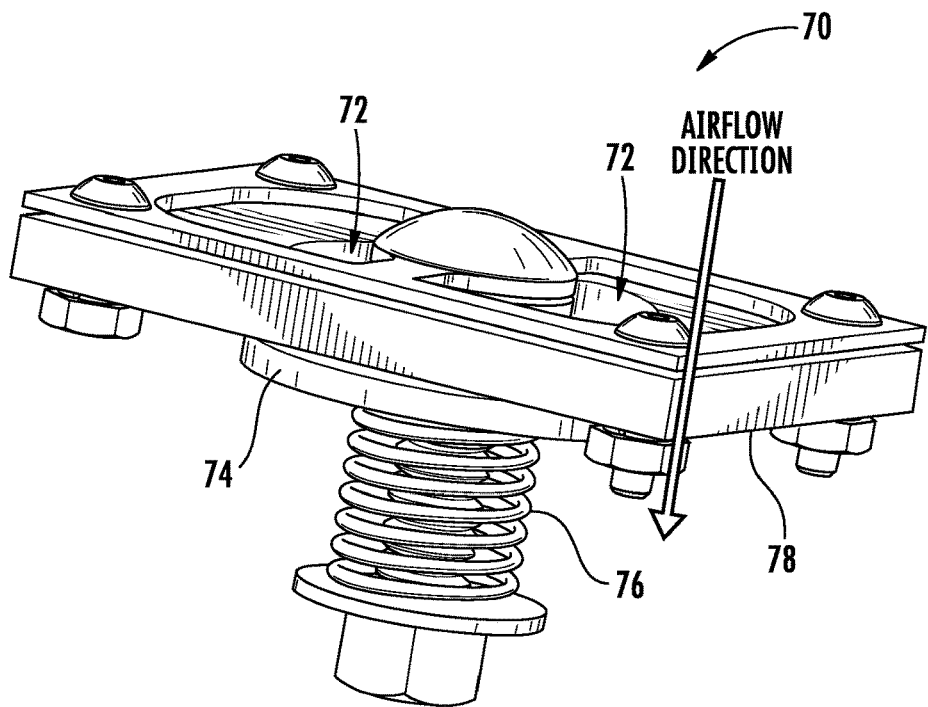
FIG. 7 is a detail perspective view of the check valve of the blower assembly.

FIG. 7 is a detail view of an exemplary embodiment of the check valve 70 of the blower assembly 50. The check valve 70 is constructed in a fairly conventional manner and comprises, for example, a suction port 72, a seal 74 for sealing the suction port 72, and an elastic biasing element 76 for biasing the seal 74 in sealing engagement with the suction port 72. As shown herein, the suction port 72 has an opening formed through a mounting plate 78 that is configured to mount the check valve 70 onto, for example, the upper surface of the blower filter 54 of the blower assembly 50, as previously described. The opening of the suction port 72 is in pneumatic communication with the airflow between the blower filter 54 and the blower 52. The seal 74 is biased by the biasing element 76 against the opening of the suction port 72 such that the check valve 70 is normally closed to the ambient atmosphere. In the event that the vacuum pressure of the airflow between the blower filter 54 and the blower 52 exceeds the predetermined maximum vacuum pressure allowable for safe operation of the blower 52, the suction force of the vacuum pressure overcomes the biasing force exerted on the seal 74 by the biasing element 76. As a result, the seal 74 is moved away from the opening of the suction port 72 and the airflow is passed from the ambient atmosphere, thereby preventing the blower 52 from potentially overheating and possibly resulting in a total failure of the blower 52.

A system 10 for loading dry bulk materials into a tank trailer 20 according to the present invention has been disclosed in the foregoing written description and shown in the accompanying drawing figures. The system 10 has been illustrated in conjunction with various exemplary embodiments of a blower assembly 50 in pneumatic communication with the interior of a tank 22 of the tank trailer 20 through one or more pneumatic conduits 24, 25. The blower assembly 50, as shown and described in the various exemplary embodiments provided herein, comprises a blower 52 pneumatically coupled to a blower filter 54 through a suction line 53 in a conventional manner. The blower assembly 50 further comprises a vacuum gauge 60 for monitoring the vacuum pressure of the airflow between the blower filter 54 and the blower 52. In addition, the blower assembly 50 may further comprise an optional check valve 70 for passing the airflow from the ambient atmosphere in the event that the vacuum pressure at the blower 52 exceeds a predetermined maximum vacuum pressure allowable for safe operation of the blower. While various exemplary embodiments of the invention have been shown and described herein for purposes of illustration, those skilled in the relevant art will understand and appreciate that numerous modifications can be made without departing from the general concepts and spirit of the invention, and that any and all such equivalents are considered to be within the broad scope of the invention as defined by the appended claims That which is claimed is:

1. A system for loading dry bulk materials into a tank trailer, comprising:
 a blower assembly in pneumatic communication with a tank of the tank trailer, the blower assembly comprising:
  a blower adapted to be operated as a vacuum;
  a blower filter in pneumatic communication with the blower;
  a suction line for providing the pneumatic communication and allowing an airflow in the suction line between the blower and the blower filter; and
  a vacuum gauge comprising a vacuum sensor positioned within the suction line for monitoring a vacuum pressure of the airflow between the blower and the blower filter.

2. The system of claim 1, wherein the blower assembly is in pneumatic communication with the tank of the tank trailer through at least one conduit.

3. The system of claim 2, wherein the vacuum sensor of the vacuum gauge measures the vacuum pressure of the airflow in the suction line between the blower and the blower filter.

4. The system of claim 1, wherein the vacuum gauge allows an operator to monitor the vacuum pressure at the blower of the blower assembly relative to a predetermined maximum vacuum pressure allowable for safe operation of the blower.

5. The system of claim 4, wherein the predetermined maximum vacuum pressure is no more than about five inches of mercury (5 in-Hg; 2.46 psi).

6. The system of claim 1, wherein the blower is configured to have an operating vacuum pressure of at least about seventeen inches of mercury (17 in-Hg; 8.35 psi).

7. The system of claim 1, wherein the blower is configured to have an operating vacuum pressure of between about seventeen inches of mercury (17 in-Hg; 8.35 psi) and about five inches of mercury (5 in-Hg; 2.46 psi).

8. The system of claim 1, wherein the blower assembly further comprises a check valve operable for passing an airflow from the ambient atmosphere to the blower in the event that the vacuum pressure between the blower and the blower filter exceeds a predetermined maximum vacuum pressure allowable for safe operation of the blower.

9. The system of claim 8, wherein the check valve comprises a suction port, a seal for sealing the suction port, and an elastic biasing element for biasing the seal in sealing engagement with the suction port.

10. The system of claim 9, wherein the check valve further comprises a mounting plate for mounting the check valve to the blower filter.

11. The system of claim 9, wherein a biasing force exerted by the biasing element on the seal is overcome to displace the seal out of sealing engagement with the suction port when the vacuum pressure of the airflow at the blower exceeds the predetermined maximum vacuum pressure.

12. A system for loading dry bulk materials into a tank trailer, comprising:
 a blower assembly in pneumatic communication with a tank of the tank trailer, the blower assembly comprising:
  a blower adapted to be operated as a vacuum;
  a blower filter in pneumatic communication with the blower;
  a suction line for providing the pneumatic communication and allowing an airflow in the suction line between the blower and the blower filter;
  a vacuum gauge comprising a vacuum sensor positioned within the suction line for monitoring a vacuum pressure of the airflow; and
  a check valve for passing an airflow from the ambient atmosphere to the blower through the suction line in the event that the vacuum pressure between the blower and the blower filter exceeds a predetermined maximum vacuum pressure allowable for safe operation of the blower.

13. The system of claim 12, wherein the check valve comprises a suction port, a seal for sealing the suction port, and an elastic biasing element for biasing the seal in sealing engagement with the suction port.

14. The system of claim 13, wherein the check valve further comprises a mounting plate for mounting the check valve to the blower filter.

15. The system of claim 13, wherein a biasing force exerted by the biasing element on the seal is overcome to displace the seal out of sealing engagement with the suction port when the vacuum pressure of the airflow between the blower and the blower filter exceeds the predetermined maximum vacuum pressure.

16. The system of claim 12, wherein the vacuum sensor of the vacuum gauge measures the vacuum pressure of the airflow in the suction line between the blower filter and the blower.

17. The system of claim 12, wherein the vacuum gauge allows an operator to monitor the vacuum pressure between the blower and the blower filter relative to the predetermined maximum vacuum pressure allowable for safe operation of the blower.

18. The system of claim 12, wherein the predetermined maximum vacuum pressure is no more than about five inches of mercury (5 in-Hg; 2.46 psi).

19. The system of claim 12, wherein the blower is configured to have an operating vacuum pressure of between about seventeen inches of mercury (17 in-Hg; 8.35 psi) and about five inches of mercury (5 in-Hg; 2.46 psi).

* * * * *